(12) United States Patent
Koerner et al.

(10) Patent No.: US 10,633,036 B2
(45) Date of Patent: Apr. 28, 2020

(54) AXLE CARRIER OF A HYBRID CONSTRUCTION MODE

(71) Applicant: Benteler Automobiltechnik GmbH, Paderborn (DE)

(72) Inventors: Matthias Koerner, Bielefeld (DE); Thomas Henksmeier, Wadersloh (DE); Guenter Fortmeier, Delbrueck (DE); Frank Hoecker, Ibbenbueren (DE); Aloys Schroeder, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 121 days.

(21) Appl. No.: 15/872,662

(22) Filed: Jan. 16, 2018

(65) Prior Publication Data
US 2019/0023329 A1 Jan. 24, 2019

(30) Foreign Application Priority Data
Jan. 17, 2017 (DE) .......................... 10 2017 100 826

(51) Int. Cl.
*B62D 29/00* (2006.01)
*B62D 21/11* (2006.01)
(Continued)

(52) U.S. Cl.
CPC ........... *B62D 29/005* (2013.01); *B62D 21/09* (2013.01); *B62D 21/11* (2013.01); *B60G 21/051* (2013.01);
(Continued)

(58) Field of Classification Search
CPC .. B62D 21/11; B62D 21/29005; B62D 21/09; B62D 27/065; B62D 29/005; B60G 21/051; B60Y 2304/05; B60Y 27/065
See application file for complete search history.

(56) References Cited

U.S. PATENT DOCUMENTS

2004/0028858 A1* 2/2004 Schnell ................... B29C 65/64
428/36.9
2012/0217715 A1* 8/2012 Ehrlich ................ B60G 21/051
280/124.128
(Continued)

FOREIGN PATENT DOCUMENTS

CN 105383063 A 3/2016
DE 10115568 B4 * 10/2005 ................ B60J 7/00
(Continued)

OTHER PUBLICATIONS

J. Rinderlin, EP 2578473 Subframe for motor vehicle, Machine English Translation, ip.com (Year: 2011).*
(Continued)

*Primary Examiner* — Karen Beck
(74) *Attorney, Agent, or Firm* — Hauptman Ham, LLP

(57) ABSTRACT

The present invention relates to an axle carrier 1 and to a method for the production of the axle carrier 1. The axle carrier 1 has an upper shell 2 from an aluminum die-casting and a lower shell 3 from a fiber composite material. On a ribbed structure of the lower shell 3, an upper end 14 of the reinforcing ribs 9 is preferably configured so as to be widened such that the bearing face between the reinforcing rib 9 and the upper shell 2 is enlarged and, on account thereof, the strength of the axle carrier 1 produced is increased.

18 Claims, 5 Drawing Sheets

(51) Int. Cl.
  *B62D 21/09* (2006.01)
  *B60G 21/05* (2006.01)
  *B62D 27/06* (2006.01)

(52) U.S. Cl.
  CPC ......... *B60Y 2304/05* (2013.01); *B62D 27/065* (2013.01)

(56) References Cited

U.S. PATENT DOCUMENTS

| | | |
|---|---|---|
| 2014/0117654 A1 | 5/2014 | Buschjohann et al. |
| 2016/0052564 A1* | 2/2016 | Graefe ............... B29C 43/16 296/204 |
| 2016/0194036 A1* | 7/2016 | Kurokawa ........... B62D 29/005 296/203.01 |
| 2016/0229456 A1* | 8/2016 | Boettcher ............ B62D 25/025 |
| 2016/0375938 A1* | 12/2016 | Matsuo ................ B62D 21/11 296/204 |
| 2017/0015357 A1* | 1/2017 | Mukainakano ........ B62D 25/04 |
| 2017/0327157 A1* | 11/2017 | Jaunasse ................ B29C 43/18 |
| 2018/0111324 A1* | 4/2018 | Kellner ................. B22F 3/1055 |
| 2018/0236881 A1* | 8/2018 | Grienitz ................ H02J 50/10 |
| 2019/0071134 A1* | 3/2019 | Izuhara ................. B62D 27/02 |

FOREIGN PATENT DOCUMENTS

| | | | | |
|---|---|---|---|---|
| DE | 102010037459 A1 * | 3/2012 | ............ | B62D 25/00 |
| DE | 102012011797 A1 | 1/2013 | | |
| EP | 2578473 A1 * | 4/2013 | ............ | B29C 45/14 |

OTHER PUBLICATIONS

German Office Action, Application No. 10 2017 100 826.8, dated Sep. 26, 2017, 8 pp.

Office Action for CN201810042757.5 dated Nov. 26, 2019; 15 pp.

* cited by examiner

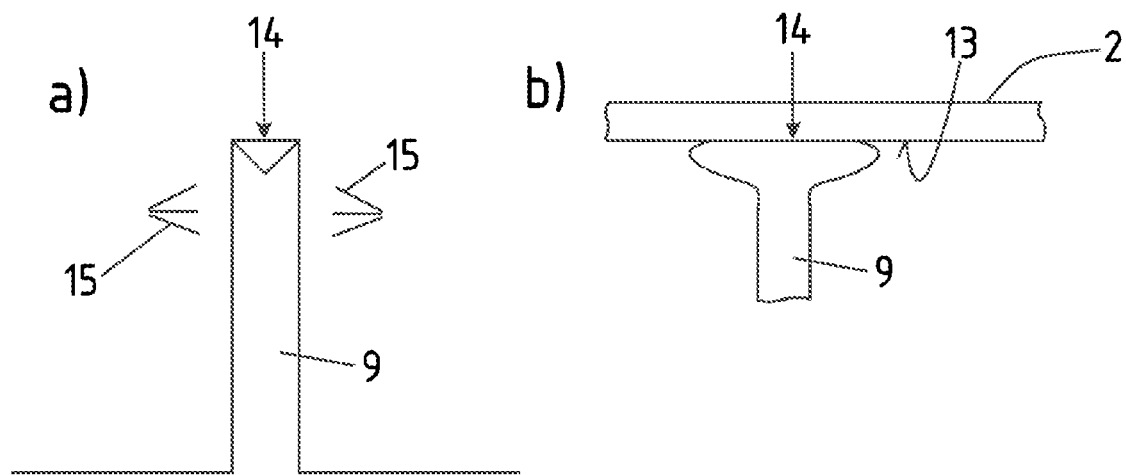
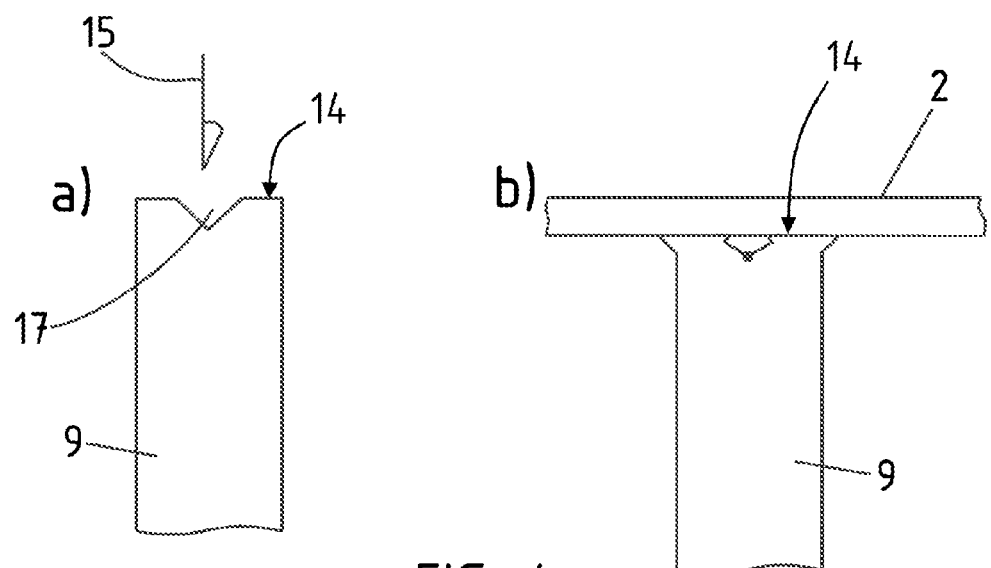

AXLE CARRIER OF A HYBRID CONSTRUCTION MODE

RELATED APPLICATIONS

The present application claims the priority of German Application Number 10 2017 100 826.8, filed Jan. 17, 2017, the disclosure of which is hereby incorporated by reference herein in its entirety.

The present invention relates to an axle carrier for a motor vehicle, according to the features in the preamble of Claim 1.

The present invention furthermore relates to a method for the production of an axle carrier, according to the features in the preamble of Claim 10.

Axle carriers which are disposed below a motor vehicle body are known from the prior art. Such an axle carrier is also referred to as an axle sub-frame. Control arms for kinematically coupling the motor vehicle wheels to the motor vehicle body are attached to an axle carrier.

A generic axle carrier is known from DE 10 2014 112 090 A1.

Proceeding from the prior art, it is an object of the present invention to further optimize an axle carrier in terms of the production thereof while at the same time improving the stiffness and stress behavior.

The aforementioned object is achieved according to the invention by the features in Claim 1.

An aspect of the object in terms of a method is achieved by the features in Claim 10.

Advantageous variants of design embodiments of the present invention are described in the dependent claims.

The axle carrier for a motor vehicle is produced as a hybrid component. Said axle carrier has an upper shell from an aluminum alloy and a lower shell from a fiber composite material. The lower shell per se has reinforcing ribs projecting in relation thereto. A cavity is configured between the assembled upper shell and lower shell. The reinforcing ribs in the cavity support the lower shell and the upper shell in relation to one another and thus stiffen the axle carrier.

The reinforcing ribs in terms of the number and/or the density and/or the wall thickness thereof are adapted to the local stiffness required in each case.

It is now provided according to the invention that the upper shell is produced as an aluminum casting, in particular by die-casting. On account thereof, by way of corresponding degrees of freedom in terms of shaping, it is possible for an upper shell that is adapted to the stresses that arise in a localized manner to be produced. As opposed to an upper shell that is produced by sheet metal forming, it is enabled at the same time for the upper shell to be produced having the wall thicknesses adapted to the stresses arising in a localized manner and/or for additional reinforcing structures to be generated in the upper shell per se.

In particular, turret-type elevations, also referred to as towers, can be configured integrally and in a materially integral manner on the upper shell directly by way of the aluminum casting method. The axle carrier is attached to the motor vehicle by way of the upper shell.

It is possible for fastenings, in particular fastening sleeves and fastening receptacles for further add-on parts, for example control arms, stabilizers, to be conjointly cast into the upper shell. These sleeves or add-on parts can be configured, for example, from a steel material and consequently can be cast in the upper shell during the aluminum casting process.

A further advantageous variant of design embodiment of the invention provides that the reinforcing ribs on that side that is opposite the lower shell, consequently at the upper end of said reinforcing ribs, are configured so as to be widened. In particular in the case of reinforcing ribs that are produced from a plastics or a plastics fiber composite, respectively, the plastics are fused on the upper side and the reinforcing rib by way of the upper end thereof is pressed onto the internal side of the upper shell when the lower shell and the upper shell are being joined. The reinforcing rib is widened herein and thus generates a larger bearing face and/or joining face on, or conjointly with, respectively, the internal side of the upper shell. An improved joint connection by virtue of a larger joining face is thus established in particular when also adhesively bonding the reinforcing rib to the upper shell. A larger support face is likewise established such that the strength in the operation of the axle carrier is further increased.

The upper shell per se is configured as a shell component and is produced so as to be U-shaped in the cross section. The upper shell in particular has longitudinal supports and transverse supports which integrally configure the upper shell in a materially integral manner. The transverse supports and longitudinal supports in this instance are in each case configured per se so as to be U-shaped in the cross section.

The lower shell is configured so as to be substantially planar and serves in particular as a thrust area such that the axle carrier is reinforced in the transverse direction and/or longitudinal direction of the motor vehicle. The lower shell can simultaneously serve as an underride protection.

The reinforcing ribs project in relation to the planar lower shell. The reinforcing ribs per se are in particular integrally configured on the lower shell in a materially integral manner. The reinforcing ribs can also be coupled to the lower shell as separate components.

Furthermore, tubes and/or cable ducts or other conduits for routing connector lines can be configured in the lower shell. Said connector lines can in particular be electrical and/or hydraulic connector lines, for example for cable harnesses and/or brake lines.

In a further preferred variant of design embodiment of the present invention the attachments to the motor vehicle body are likewise configured from the fiber composite material of the lower shell. The attachments are thus configured in particular from the plastics of the fiber composite material, this simultaneously enabling damping of vibrations. The plastics is also referred to as the matrix or matrix resin, respectively. Additional rubber/metal bearings can be dispensed with on account thereof. This saves costs in terms of individual parts, on the one hand, while a separate joining procedure of rubber/metal bearings and the axle carrier becomes dispensable, on the other hand. The attachments from plastics or from the fiber composite material, respectively, have a positive property in terms of vibration and noise damping.

Alternatively or additionally, it is possible for attachments of suspension components or else attachments to the motor vehicle body to be configured on the upper shell. To this end, the attachments, in particular the receptacle for such an attachment, consequently at least a sleeve, are cast in the upper shell.

In order for the lower shell and the upper shell to be coupled, the two former are joined together in particular in a materially integral manner by adhesive bonding. The matrix resin or the plastics of the fiber composite material, respectively, can in particular be utilized herein as the adhesive. In particular, an additional bonding agent is used herein. It is also conceivable for an additional adhesive to be used in order for the lower shell and the upper shell to be intercoupled.

In a further preferred variant of design embodiment of the present invention, the upper shell, on the internal side thereof, or so as to be oriented toward the internal side, has clearances and/or undercuts. The lower shell and/or reinforcing ribs of the lower shell engage in an at least partially form-fitting manner in these clearances or undercuts, respectively. A materially integral contact between the fused plastics or adhesive, respectively, and the upper shell, as well as simultaneously a form-fitting undercut and thus a form-fitting additional coupling, is established at these locations, Additionally to adhesive bonding, the upper shell and lower shell can optionally be intercoupled by additional coupling methods, for example by riveting, screw fitting, clinching, or the like.

Furthermore preferably, at least one sleeve is disposed in the cavity between the upper shell and the lower shell in such a manner that, when being coupled to a motor vehicle body, the upper shell bears on the motor vehicle body by means of the sleeve. It is thus possible, for example, for a body attachment screw to be routed through the sleeve, the contact pressure force of the screw pressing the upper shell onto the motor vehicle body. The screw simultaneously bears conjointly on the lower shell. Any potential softness of the fiber composite material is compensated for. To this end, it is furthermore preferably provided that a cover, in particular in the form of a disc, is disposed on an external side of the lower shell so as to be in direct contact with the sleeve, wherein the disc at least partially covers the lower shell. The force of the body attachment screw is thus transmitted by the disc to this sleeve and to the upper shell. The disc simultaneously covers the lower shell and holds the latter in a likewise form-fitting manner on the motor vehicle body.

The method according to the invention for the production of an axle carrier having at least one of the aforementioned features provides that a lower shell from a fiber composite material is provided by injection molding or impact extruding, the upper shell being provided by way of aluminum casting, in particular aluminum die-casting. The method is furthermore distinguished in that the reinforcing ribs that project in relation to the lower shell at an upper end are not cured and/or are heated and, when the lower shell is being pressed onto the upper shell, are widened in such a manner that a larger bearing face and/or coupling face of the respective reinforcing rib is configured on the internal side of the upper shell.

Alternatively or additionally it is furthermore provided that plastics material of the fiber composite material of the reinforcing rib is pressed into a clearance and/or into or through, respectively, an undercut of the upper shell, and here configures a form-fitting undercut.

The lower shell can be produced according to the invention by two production methods. Impact extruding is employed, on the one hand. To this end, a GMT (glass fiber mat reinforced thermoplastic composite) sheet is used for the lower shell. Polypropylene or polyamide plastics is preferably used as the matrix or plastics material, respectively. Glass fibers are preferably used as the fiber material for the fibrous material. Carbon fibers, basalt fibers, metal fibers, or other known fiber materials can also be used.

The GMT sheet is composed of at least one fiber tier. Said sheets, depending on the requirements in terms of stress, can be woven fiber fabrics/fibrous scrims, long-fiber mats or short-fiber mats. In the case of a multi-fiber tier GMT sheet a combination of different fiber tiers can also be used.

Individual patches can also be applied to the GMT sheet in order for the lower shell to be reinforced in parts. It is advantageous in the case of impact extruding that the reinforcing ribs can be integrally produced from the GMT sheet. To this end, smaller GMT sheets having short fibers are stacked on said GMT sheet in the region of the reinforcing ribs to be generated. These GMT sheets having short fibers are later shaped into the ribbed structure by the impact extrusion method. The GMT semi-finished product thus configured is first heated in an oven at approx. 200° C. until said GMT semi-finished product is readily deformable. The semi-finished product thus heated is transported to an impact extrusion tool. The impact extrusion tool has a temperature of 50 to 70° C. The GMT semi-finished product is formed into the desired lower shell in the impact extrusion tool.

The production of the ribs is integrated in this production method. The side of the GMT sheet for the lower shell that is provided with individual GMT sheets for the production of the reinforcing ribs is directed downward in the vertical direction in the lower mold of the impact extrusion tool. The matrix is fused and by virtue of gravity, conjointly with the short fibers, flows downward and herein forms the reinforcing ribs. The lower shell thus produced is removed from the impact extrusion tool after curing.

If the GMT lower shell is first to be produced without the ribbed structure, the reinforcing ribs can be coupled thereto in a separate processing step, for example by insertion molding or by producing the ribs separately by impact extrusion or injection molding and subsequent welding or adhesive bonding, respectively. The lower shell and the reinforcing ribs can thus be produced in a mutually separate manner. The reinforcing ribs can be coupled to the upper shell, for example, in particular by injecting and/or adhesive bonding. The upper shell and the lower shell are then subsequently joined together, wherein the reinforcing ribs are also connected to the lower shell in a materially integral manner herein. To this end, a plastics welding process is employed in particular.

The second possibility for the production of the lower shell is an injection-molding method. The fused matrix, consequently the plastics material, herein is mixed with short fibers and injected into a mold. Polypropylene or polyamide is also preferably used here as the matrix.

Both a tool without a mold for the production of the ribs, as well as one with an additional mold for the production of the ribs, can be used herein. Here too, the ribs are conjointly produced in a downward manner in relation to the vertical direction.

The upper shell and the lower shell are in particular joined together by adhesive bonding. Joining herein is performed with additional bonding agents and/or adhesive materials, for example acrylic adhesives or epoxy adhesives. However, it is also conceivable for the fused plastics, or the matrix of the fiber composite material, respectively, per se to function as the adhesive. To this end, additional bonding agents, in particular on the upper shell, are used in particular.

The invention will be explained in more detail hereunder by means of exemplary embodiments that are illustrated in schematic drawings, in which.

Figure 1:
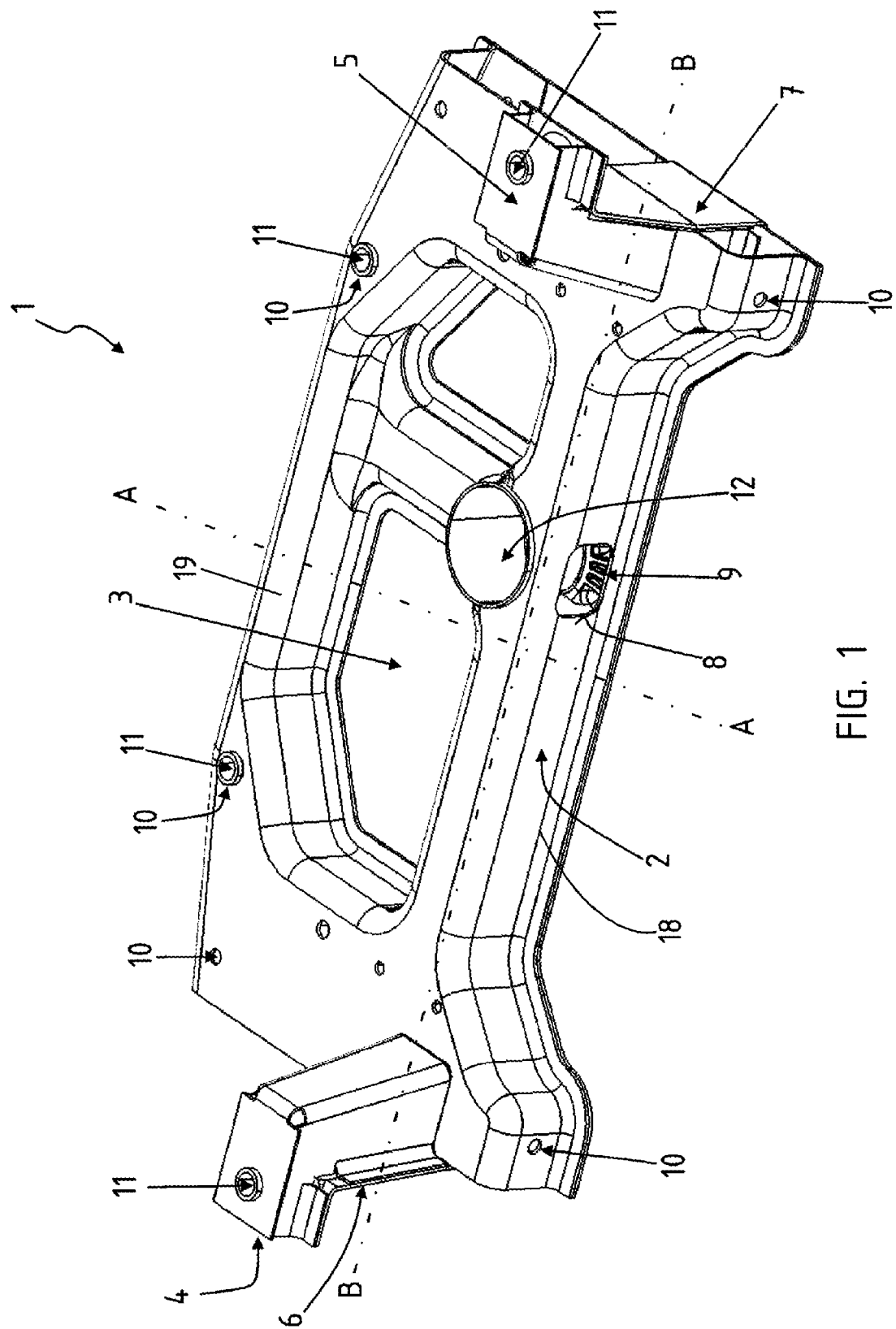
FIG. 1 shows an axle carrier according to the invention in the assembly.
Figure 5:
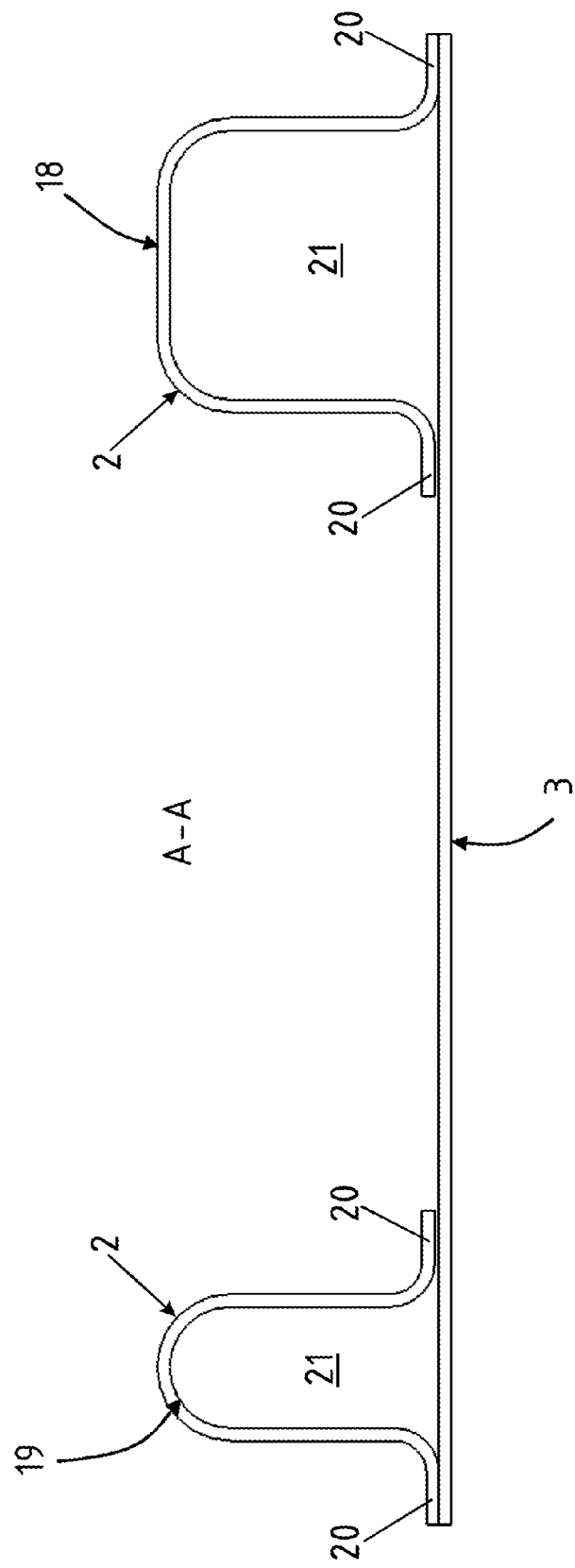

FIGS. 3a) and b) show a reinforcing rib in a sectional view;

FIGS. 4a) and b) show an upper end of a reinforcing rib;

FIG. 5 shows a cross-sectional view according to A-A from FIG. 1; and

Figure 6:
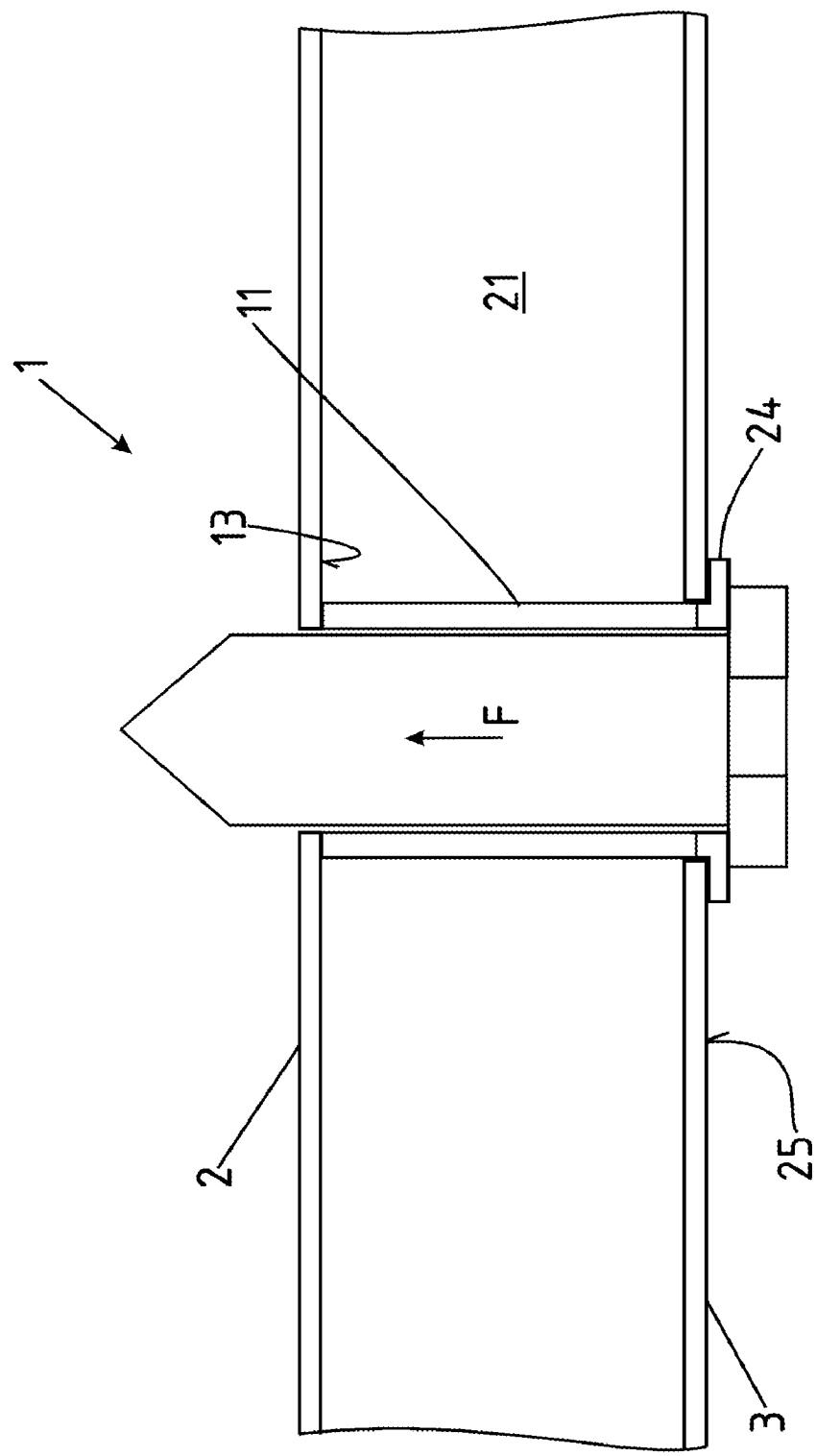

FIG. 6 shows a sectional view through the axle carrier having the sleeve.

The same reference signs are used for the same or similar components in the figures, even when a repetition of the description is omitted for reasons of simplification.

FIG. 1 shows an embodiment of an axle carrier 1 according to the invention in the assembly. The axle carrier 1 comprises an upper shell 2, a lower shell 3, and a ribbed structure having reinforcing ribs 9 for stiffening the upper shell 2. The reinforcing ribs 9 in FIG. 1 can be seen only through the opening 8 as said reinforcing ribs 9 are otherwise completely inside the cavity 21 of the axle carrier 1. The upper shell 2 in this exemplary embodiment is produced as an injected-molded component from an aluminum alloy. The lower shell 3 is composed of a fiber-reinforced plastics, wherein the fiber reinforcement preferably includes both long fibers as well as short fibers. The reinforcing ribs 9 are configured conjointly with the lower shell 3 so as to be integral thereto, and are composed of a short fiber-reinforced plastics. The fibers herein have a length of up to ten centimeters.

Furthermore, two attachment towers 4, 5 are attached to the upper shell 2. Said attachment towers 4, 5 serve for attaching the axle carrier 1 to the vehicle body. Stiffening portions 6, 7 which protrude into the attachment towers 4, 5 are optionally configured from the lower shell 3. The lower shell 3 per se is configured as a planar face without clearances, and closes the upper shell 2 across the entire area from below. The stiffening portions 6, 7 are angled upward, so as to point toward the upper shell 2, in relation to the planar plane of the lower shell 3, the former in turn closing off the attachment towers 4, 5. The attachment towers 4, 5 are produced as separate components and are connected in a materially integral manner to the upper shell 2. Said attachment towers 4, 5 form particularly designed attachment locations for other suspension parts and to this end are provided with attachment sleeves 11. Other attachment locations 10 for other suspension parts such as, for example, a stabilizer or a control arm, are likewise provided partially with attachment sleeves 11 for reinforcement.

The bearing 12 represents a further particularly configured attachment location. Said bearing 12 serves for attaching a torque support of the engine block and thus for supporting the torques of the engine block.

On account of the upper shell 2 being produced according to the invention from aluminum casting, the attachment towers 4, 5 can be integrally configured in a materially integral manner. The various attachment locations 10 and/or attachment sleeves 11 can likewise be conjointly cast in the aluminum casting. The upper shell can have mutually dissimilar wall thicknesses which in particular correspond to the predefined strength.

Figure 2:
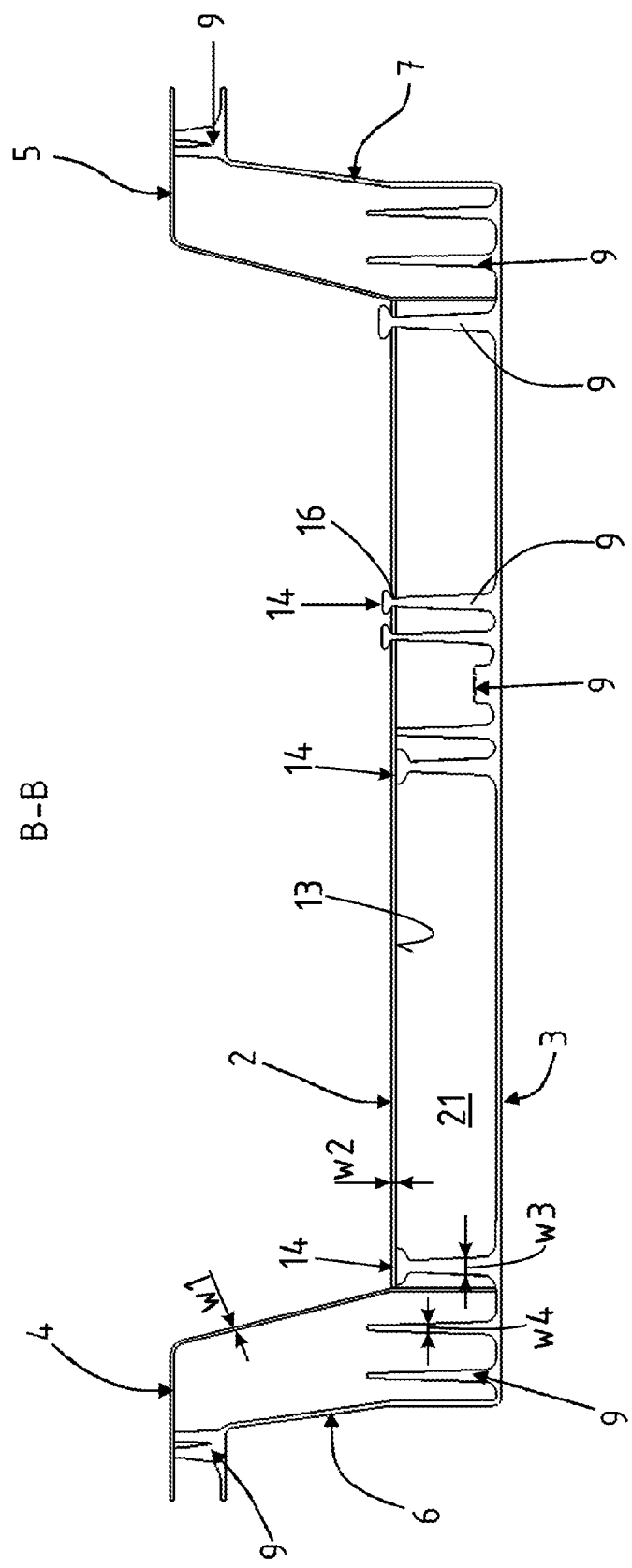
FIG. 2 shows a longitudinal sectional view according to B-B from FIG. 1.

FIG. 2 shows a longitudinal section according to the section line B-B of FIG. 1. The reinforcing ribs 9 which in particular bear at least partially on an internal side 13 of the upper shell 2 can be readily seen. An upper end 14 of the reinforcing ribs herein is widened according to the invention, in particular according to the principle of a mushroom head. This is illustrated on the left side in relation to the image plane. This is shown in a detailed illustration in FIGS. 3a) and b). An upper end 14 of the reinforcing rib 9 is first heated, as illustrated by thermal rays 15. The heat can be applied by means of hot air, for example. The reinforcing rib 9 is thereupon pressed onto the internal side 13 of the upper shell 2. The upper end widens according to the principle of a mushroom head. A larger bearing face is thus provided but a materially integral connection is also generated at the same time. The reinforcing ribs 9 can have mutually dissimilar wall thicknesses W3, W4. The upper shell 2 can also have mutually dissimilar wall thicknesses W1, W2.

Alternatively however, according to FIGS. 4a) and b) it is also possible for the upper end of the reinforcing rib 9 to be provided with a V-shaped gap 17 or wedge, respectively, and to likewise fuse here by way of thermal rays 15 by hot air, for example. On account thereof, V-shaped splitting of the upper end 14 of the reinforcing rib 9 is supported when the latter is being pressed on, as is illustrated in FIG. 4b).

It is furthermore illustrated in FIG. 2, on the right side in relation to the image plane, that the upper end 14 of the respective reinforcing rib 9 penetrates a clearance 16 of the upper shell 2 and in particular configures an undercut in the manner of a mushroom head. An additional form-fitting coupling is provided on account thereof.

According to the cross-section of the section line A-A illustrated in FIG. 5, transverse supports 18, 19 are furthermore illustrated on the axle carrier 1. The upper shell 2 in the respective cross section has a U-shaped or hat-shaped configuration, respectively. Laterally projecting flanges 20, such that a hat-shaped configuration is configured, for example, can in this instance be coupled to the lower shell 3 in a materially integral manner, for example by adhesive bonding.

A sleeve which is disposed in a cavity between the lower shell 3 and the upper shell 2 is furthermore illustrated in FIG. 6. The sleeve bears on the internal side 13 of the upper shell 2 in form-fitting manner. A body screw 23 that penetrates the sleeve 11 is engaged from below by a disc or washer 24, respectively. The washer 24 bears on the sleeve 11 and by way of the force F presses the screw directly onto the upper shell 2. The washer 24 at the same time covers an external side 25 of the lower shell 3 such that any migrating or creeping of the fiber composite material of the lower shell 3 is avoided to the largest extent possible and does not have any effect on the strength of the screw connection established between the axle carrier 1 and the motor vehicle body.

LIST OF REFERENCE SKINS

1—Axle carrier
2—Upper shell
3—Lower shell
4—Attachment tower
5—Attachment tower
6—Stiffening portion
7—Stiffening portion
8—Opening
9—Reinforcing ribs
10—Attachment location
11—Attachment sleeve
12—Bearing
13—Internal side (to 2)
14—Upper end (to 9)
15—Thermal rays
16—Clearance
17—Gap
18—Transverse support (to 2)
19—Transverse support (to 2)
20—Flange (to 2)
21—Cavity
22—Internal side (to 3)
23—Body screw
24—Washer 25—External side (to 3)
F—Force
W1—Wall thickness
W2—Wall thickness
W3—Wall thickness
W4—Wall thickness

The invention claimed is:

1. An axle carrier for a motor vehicle, the axle carrier comprising:
an upper shell from an aluminum alloy, and
a lower shell from a fiber composite material,
wherein the lower shell has reinforcing ribs projecting towards the upper shell, the reinforcing ribs are at least partially disposed in a cavity that is formed between the upper shell and the lower shell,
wherein the upper shell is a casting,
wherein the reinforcing ribs have widened upper ends bearing on the upper shell,
wherein the lower shell is joined to the upper shell in a materially integral manner by adhesive bonding.

2. The axle carrier according to claim 1, wherein the upper shell has a U shaped cross section, the upper shell having longitudinal supports and transverse supports, wherein the longitudinal supports and transverse supports are each U shaped in cross section.

3. The axle carrier according to claim 1, wherein the lower shell is planar, wherein tubes or cable ducts for routing connector lines are provided in the lower shell.

4. The axle carrier according to claim 1, wherein
attachments to a motor vehicle body comprise the fiber composite material of the lower shell, or
attachments of suspension components are configured on the upper shell, wherein said attachments of suspension components are conjointly cast in the casting.

5. The axle carrier according to claim 1, wherein the reinforcing ribs comprise a fiber composite material and are integrally configured on the lower shell.

6. The axle carrier according to claim 1, wherein
the upper shell has clearances,
the reinforcing ribs extend from inside the cavity through the clearances, and have the widened upper ends located outside the cavity, and
the reinforcing ribs comprise a plastic material engaging in a form-fitting manner in the clearances.

7. The axle carrier according to claim 1, further comprising at least one sleeve disposed in the cavity between the upper shell and the lower shell, wherein when coupled to a motor vehicle body the upper shell is configured to be pressed onto the motor vehicle body by the sleeve.

8. The axle carrier according to claim 7, further comprising a cover, which at least partially covers the lower shell, and is disposed on an external side of the lower shell and in direct contact with the sleeve.

9. A method of producing an axle carrier,
the axle carrier comprising:
an upper shell from an aluminum alloy, and
a lower shell from a fiber composite material,
wherein the lower shell has reinforcing ribs projecting towards the upper shell, the reinforcing ribs are at least partially disposed in a cavity that is formed between the upper shell and the lower shell,
wherein the upper shell is a casting, and
wherein the reinforcing ribs have widened upper ends bearing on the upper shell,
the method comprising:
producing the lower shell from the fiber composite material by injection molding or impact extruding,
producing the upper shell by casting,
when the upper ends of the reinforcing ribs are not cured or are heated, pressing the lower shell onto the upper shell to cause the upper ends of the reinforcing ribs to be widened in such a manner that larger bearing faces of the reinforcing ribs are configured, and
pressing a plastics material of the reinforcing ribs into and through clearances formed in the upper shell to configure a form-fitting undercut, wherein the reinforcing ribs extend from inside the cavity through the clearances and have the widened upper ends located outside the cavity.

10. The method according to claim 9, wherein the lower shell and the reinforcing ribs are produced separately and are subsequently intercoupled, wherein the reinforcing ribs are injected into the upper shell and coupled to the lower shell by a materially integral coupling.

11. The method according to claim 9, wherein the reinforcing ribs are produced by injection molding and are adhesively bonded into the upper shell and are coupled to the lower shell in a materially integral manner.

12. The axle carrier according to claim 1, wherein the reinforcing ribs are coupled to the lower shell.

13. The axle carrier according to claim 1, wherein the adhesive bonding comprises plastics of the fiber composite material.

14. The axle carrier according to claim 13, wherein the lower shell is joined to the upper shell further by an additional form-fitting coupling.

15. The axle carrier according to claim 1, wherein the adhesive bonding comprises a separate adhesive.

16. The axle carrier according to claim 15, wherein the lower shell is joined to the upper shell further by an additional form-fitting coupling.

17. The axle carrier according to claim 1, wherein the upper shell is a die-casting.

18. The axle carrier according to claim 8, wherein the cover comprises a washer.

* * * * *